No. 763,018. PATENTED JUNE 21, 1904.
C. N. PAVER.
APPARATUS FOR SEPARATING COAL AND COKE FROM ASHES.
APPLICATION FILED DEC. 12, 1903.
NO MODEL.

Witnesses
W. F. Murray
A. McCormack

Inventor
Charles Nelson Paver
By C. W. Mills
Attorney

THE NORRIS PETERS CO., PHOTO-LITHO., WASHINGTON, D. C.

No. 763,018.  
Patented June 21, 1904.

UNITED STATES PATENT OFFICE.

CHARLES NELSON PAVER, OF CINCINNATI, OHIO.

APPARATUS FOR SEPARATING COAL AND COKE FROM ASHES.

SPECIFICATION forming part of Letters Patent No. 763,018, dated June 21, 1904.

Application filed December 12, 1903. Serial No. 184,943. (No model.)

*To all whom it may concern:*

Be it known that I, CHARLES NELSON PAVER, a citizen of the United States, residing at Cincinnati, in the county of Hamilton and State of Ohio, have invented certain new and useful Improvements in Apparatus for Separating Coal and Coke from Ashes; and I do hereby declare the following to be a full, clear, and exact description of the invention, such as will enable others skilled in the art to which it appertains to make and use the same.

My invention relates to improvements in apparatus for separating coal, coke, and cinders from ashes.

One of its objects is to provide apparatus which will separate coal and partially-burned coke from ashes without requiring the shaking or sifting thereof.

Another object is to provide such apparatus so inclosed as to prevent the fine particles of ashes escaping and settling on other articles.

It further consists in certain details of form, combination, and arrangement, all of which will be more fully set forth in the description of the accompanying drawings, in which—

Figure 1:
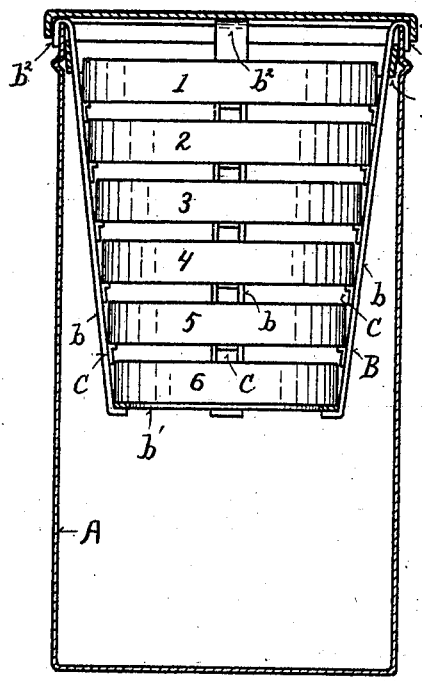
Figure 3:
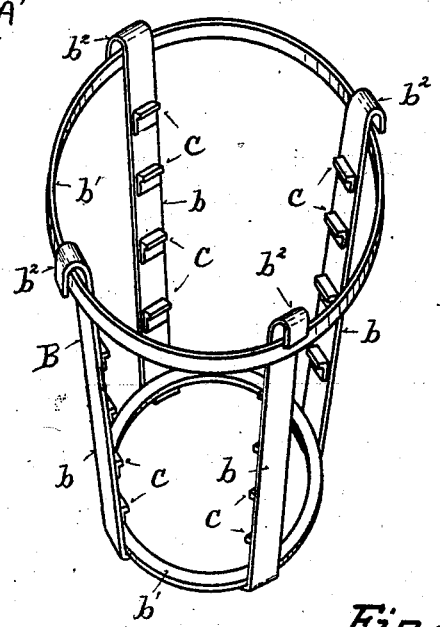
Figure 2:
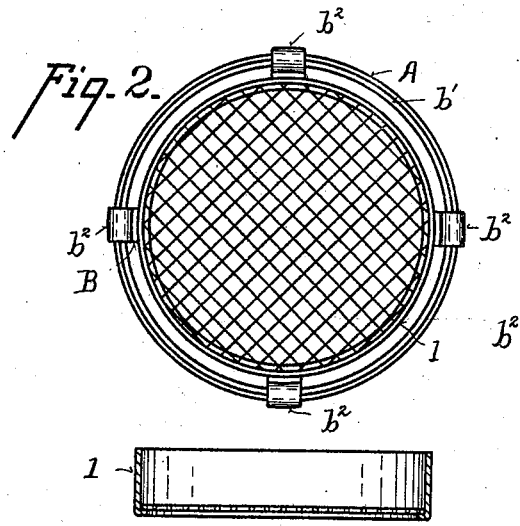
Figure 4:
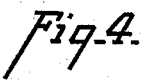
Figure 5:
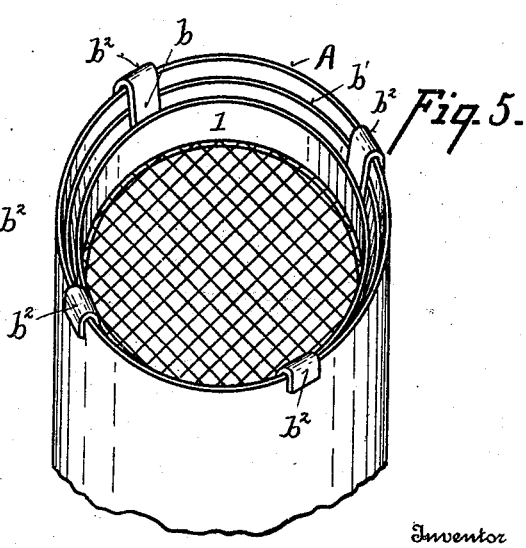

Figure 1 is a central vertical section through my improved apparatus. Fig. 2 is a top plan view of the same. Fig. 3 is a perspective view of the supporting-frame. Fig. 4 is a central vertical section through one of the screen-pans. Fig. 5 is a perspective view of the upper portion of the apparatus with the lid removed.

A represents a can, barrel, or other receptacle to receive the ashes, which is preferably provided with a lid A'.

B represents the supporting-frame, composed of a series of uprights $b$, secured together by bands $b'$, the upper ends of the uprights being preferably bent over to form hooks $b^2$, which engage the upper edge of the can to suspend the frame therein. A series of brackets $c$ are secured to the uprights $b$ at regular intervals.

1, 2, 3, 4, 5, and 6 represent screen-pans, the sides of which are preferably of sheet metal and the bottom of wire screen. These pans are successively of smaller diameter and so arranged relative to the supporting-frame that the smaller pans pass the brackets designed to support the larger pans until they reach their proper place in the series. The mesh or size of the openings in the screens of the pans decrease from top to bottom of the series, the mesh of the top pan being one and a half or two inches and the mesh of the successive pans decreasing to one-fourth to one-half inch in the bottom pan. The pans are preferably arranged so as to leave a space between the bottom of one pan and the top edge of the next lower pan. A space is left in the can below the lower pan to receive the ashes.

In practice the lid is removed and the mixture of coal, coke, and ashes dumped into the top screen-pan. As the meshes of this pan are excessively large, all or nearly all of the charge passes through, being, however, divided or broken up in its passage through the screen. The effect of the charge passing through the series of pans is to tumble the particles of coal and coke in their passage, so that the ashes are freed therefrom, and still leaving the coal and coke resting lightly on the screens instead of being packed and wedged into the meshes, as would be done by shaking or sifting. In this manner each successive screen separates out a fraction of the coal and coke and divides up the charge until the fine ashes are finally deposited in the bottom of the can. A considerable portion of the fine ash also passes through the openings between the pans and then settles to the bottom of the can outside the frame. The coal and coke may be recovered after each operation or at the end of two or more operations, as desired.

I am thus enabled to separate the coal and coke without the necessity of shaking or sifting the ashes and to obtain a better result and recover a larger per cent. thereof than where shaking is resorted to. Practically none of the fine ash escapes through the mouth of the can, even if the lid is not immediately replaced.

Having described my invention, what I claim is—

1. In combination with a receptacle to receive ashes, a skeleton supporting-frame depending from the mouth of said receptacle, a series of screen-pans stationarily supported in the upper portion of the receptacle upon said frame, open spaces between the respective screen-pans, and spaces between the side walls of the pans and the inside wall of the receptacle, the meshes of the screens decreasing in size from the top downward, whereby the charge is automatically separated and graded in its passage through the respective screens, and the fine suspended material is free to pass between the screens, and thence settle to the bottom of the receptacle through the space between the screens and the inner wall of the receptacle.

2. In combination with a receptacle to receive ashes, a skeleton frame consisting of inclined uprights provided with brackets, and connecting-bands stationarily supported with reference to the receptacle, a series of screen-pans of successively-decreasing diameter stationarily seated upon said brackets, the mesh of the respective pans decreasing from the top downward, whereby the charge is automatically separated and graded in its passage through the respective screens.

3. In combination with a receptacle to receive ashes, a supporting-frame mounted within said receptacle and stationarily with reference thereto, a series of screen-pans of different diameters, brackets arranged in sets upon the supporting-frame to seat and stationarily support the pans of different diameter in a predetermined order one above the other, the mesh of the respective pans decreasing in size from the top downward.

4. In combination with a receptacle to receive ashes, an extended series of screen-pans of different diameter stationarily supported one above the other in and relative to the upper part of said receptacle, the meshes of the respective pans decreasing in size from the top downward, and brackets arranged in sets, each set being adapted to support only a pan of a particular diameter, whereby the sifting and grading is automatically effected by the tumbling action of the charge in falling successively from screen to screen.

In testimony whereof I have hereunto set my hand in presence of two subscribing witnesses.

CHARLES NELSON PAVER.

Witnesses:
   C. W. MILES,
   A. McCORMACK.